(12) United States Patent
Slabaugh et al.

(10) Patent No.: US 7,333,105 B2
(45) Date of Patent: Feb. 19, 2008

(54) ACTIVE POLYHEDRON FOR 3D IMAGE SEGMENTATION

(75) Inventors: Gregory G. Slabaugh, Princeton, NJ (US); Gozde Unal, West Windsor, NJ (US); Jason Jenn-Kwei Tyan, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 206 days.

(21) Appl. No.: 11/067,151

(22) Filed: Feb. 24, 2005

(65) Prior Publication Data

US 2005/0195185 A1 Sep. 8, 2005

Related U.S. Application Data

(60) Provisional application No. 60/549,468, filed on Mar. 2, 2004.

(51) Int. Cl.
*G06T 17/00* (2006.01)
*G06K 9/34* (2006.01)

(52) U.S. Cl. ...................................... 345/420; 382/164
(58) Field of Classification Search ................. 382/164
See application file for complete search history.

(56) References Cited

U.S. PATENT DOCUMENTS 5,903,664 A * 5/1999 Hartley et al. ............... 382/154
6,249,594 B1 * 6/2001 Hibbard ...................... 382/128

OTHER PUBLICATIONS

A. Gupta, L. von Kurowski, A. Singh, D. Geiger, C-C. Liang, M-Y. Chiu, L.P. Adler, M. Haacke, D.L.Wilson, "Cardiac MR Image Segmentation Using Deformable Models," Sep. 5, 1993, Proceedings of Computers in Cardiology 1993, p. 747-750.*

T. McInerney, D. Terzopoulos, "Topology Adaptive Deformable Surfaces for Medical Image Volume Segmentation," Oct. 1999, IEEE Transactions on Medical Imaging, vol. 18, No. 10, p. 840-850.*

T.F. Chan, L.A. Vese, "Active Contours without Edges," Feb. 2001, IEEE Transactions on Image Processing, vol. 10, No. 2, p. 266-277.*

G. Unal, H. Krim, A. Yezzi, "A Vertex-Based Representation of Objects in an Image," Sep. 22, 2002, 2002 International Conference on Image Processing, vol. 1, p. I-896-I-899.*

Gozde Bozkurt Unal, "Curve an Polygon Evolution Techniques for Image Processing," 2002, Ph.D. thesis, North Carolina State University, p. 50-120.*

\* cited by examiner

*Primary Examiner*—Kee M. Tung
*Assistant Examiner*—Jason M Repko
(74) *Attorney, Agent, or Firm*—Donald B. Paschburg; F. Chau & Associates, LLC

(57) ABSTRACT

A method for three dimensional image segmentation of a volume of interest includes providing a three dimensional image of the volume of interest, providing an initial polyhedron having a plurality of mesh vertices within the three dimension image and determining an image-based speed at each vertex of the polyhedron using an ordinary differential equation (ODE) that describes the vertex motion of the polyhedron. The method further includes determining a regularization term at each vertex of the polyhedron, updating the plurality of mesh vertices of the polyhedron, integrating the image-based speed of each vertex over a face of the polyhedron, and determining an output polyhedron approximating a shape of the volume of interest.

14 Claims, 6 Drawing Sheets

0   10   20   30   35   CONTINUOUS ACTIVE SURFACE W/LEVEL SET METHODS

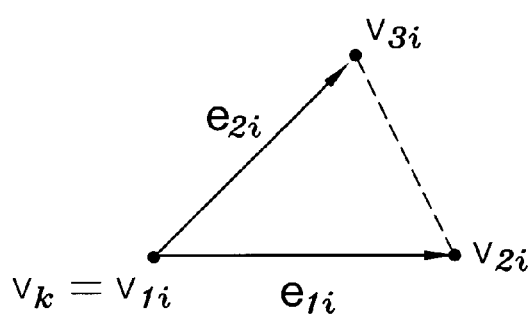
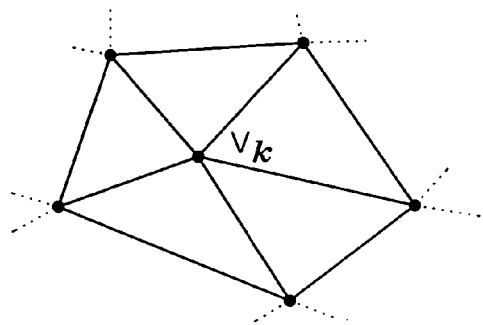
FIG. 2A  FIG. 2B
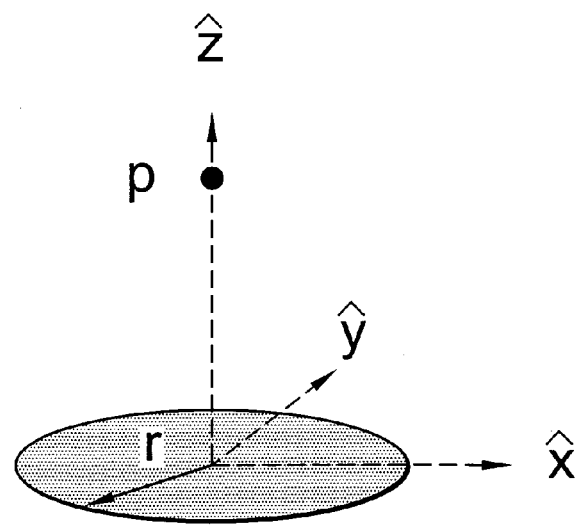
FIG. 3

ACTIVE POLYHEDRON FOR 3D IMAGE SEGMENTATION

This application claims priority to U.S. Provisional Application Ser. No. 60/549,468, filed on Mar. 2, 2004, which is herein incorporated by reference in its entirety.

BACKGROUND OF THE INVENTION

1. Technical Field

The present invention relates to image segmentation, and more particularly to a system and method for a three-dimensional image segmentation using an active polyhedron.

2. Discussion of Related Art

Segmentation is a vital component of many clinical medical imaging applications, including anatomic analysis and modeling, morphological measurement, visualization, and surgical planning. Unfortunately, segmentation is often a challenging problem due to difficulties resulting from noise, limited contrast, and weak boundaries often observed in medical images. While manual segmentation can help address such issues, it requires tedious, labor-intensive work, particularly for three dimensional (3D) data. Consequently, there has been much recent interest in automated segmentation approaches, which can be grouped in to two major categories.

First, deformable surfaces that represent a surface explicitly have been used in numerous medical imaging problems, including the segmentation of anatomical structures. While it is possible to model topological changes using an explicit surface representation, an advantage of the second major category of segmentation approaches, those based on level set methods, is that they rely on an implicit surface representation that can automatically change topology when necessary.

Although the function that controls the speed of each vertex in either the explicit or implicit schemes may depend on a local, global, or region-based statistic or descriptor, the motion of each vertex is not coupled to its neighbor vertices or adjacent faces. As a result, such methods are prone to segmentation errors resulting from local variations in the statistic or descriptor, and can therefore produce erroneous segmentations. In particular, the surface may leak into nearby unrelated regions or break apart into multiple disconnected pieces, or have an irregular shape.

Therefore, a need exists for a system and method for robust 3D image segmentation.

SUMMARY OF THE INVENTION

In addition to using a global descriptor function, a system and method according to an embodiment of the present disclosure uses an active polyhedron that integrates the motion of each vertex over the polyhedral faces, effectively providing a lowpass filtering effect on the data measurements. An active polyhedron according to the present disclosure offers increased robustness to noise, particularly in presence of speckle observed in ultrasound data. This type of noise is spatially correlated and contaminates pointwise image measurements. An active polyhedron is less prone to segmentation errors resulting from local variations in the speed function, and in such cases, will be more effective at aligning its faces with the target structure.

According to an embodiment of the present disclosure, a method for three dimensional image segmentation of a volume of interest comprises providing a three dimensional image of the volume of interest, providing an initial polyhedron having a plurality of mesh vertices within the three dimension image and determining an image-based speed at each vertex of the polyhedron using an ordinary differential equation (ODE) that describes the vertex motion of the polyhedron. The method further comprises determining a regularization term at each vertex of the polyhedron, updating the plurality of mesh vertices of the polyhedron, integrating the image-based speed of each vertex over a face of the polyhedron, and determining an output polyhedron approximating a shape of the volume of interest.

The method comprises determining iteratively the image-based speed of each vertex and the regularization term, and updated mesh vertices until the vertices of the polyhedron have converged.

The method comprises performing a mesh operation after updating the plurality of mesh vertices of the polyhedron to grow or shrink a surface of the polyhedron. The mesh operation is one of an edge split, an edge collapse and a face split.

The regularization term prevents a surface of the polyhedron from self-intersecting. The regularization term increases in influence as a vertex approaches a surface of the polyhedron. The regularization term is based on electrostatic principles and does not penalize high curvature.

The method comprises determining a topological change in the polyhedron after updating the plurality of mesh vertices of the polyhedron.

A program storage device is provided readable by machine, tangibly embodying a program of instructions executable by the machine to perform method steps for three dimensional image segmentation of a volume of interest. The method comprises providing a three dimensional image of the volume of interest, providing an initial polyhedron having a plurality of mesh vertices within the three dimension image and determining an image-based speed at each vertex of the polyhedron using an ordinary differential equation (ODE) that describes the vertex motion of the polyhedron. The method further comprises determining a regularization term at each vertex of the polyhedron, updating the plurality of mesh vertices of the polyhedron, integrating the image-based speed of each vertex over a face of the polyhedron, and determining an output polyhedron approximating a shape of the volume of interest.

BRIEF DESCRIPTION OF THE DRAWINGS

Preferred embodiments of the present invention will be described below in more detail, with reference to the accompanying drawings:

FIGS. 2A-B are illustrate the vertices and edges used in the parameterization of a triangle according to an embodiment of the present disclosure;

FIG. 3 is an illustration of an electric field of a disk of charge;

DETAILED DESCRIPTION OF PREFERRED EMBODIMENTS

According to an embodiment of the present disclosure, an active polyhedron is a 3D deformable surface for the segmentation of medical images. Rooted in curve and surface evolution theory, an active polyhedron is a polyhedral surface whose vertices deform to minimize a region-based energy functional. Unlike continuous active surface models, the vertex motion of an active polyhedron is computed by integrating speed terms over polygonal faces of the surface. The resulting ordinary differential equations (ODEs) provide improved robustness to noise and allow for larger time steps compared to continuous active surfaces implemented with level set methods. An electrostatic regularization method achieves global regularization while better preserving sharper local features. Experimental results demonstrate the effectiveness of an active polyhedron in segmenting noisy medical image data.

Figure 1:
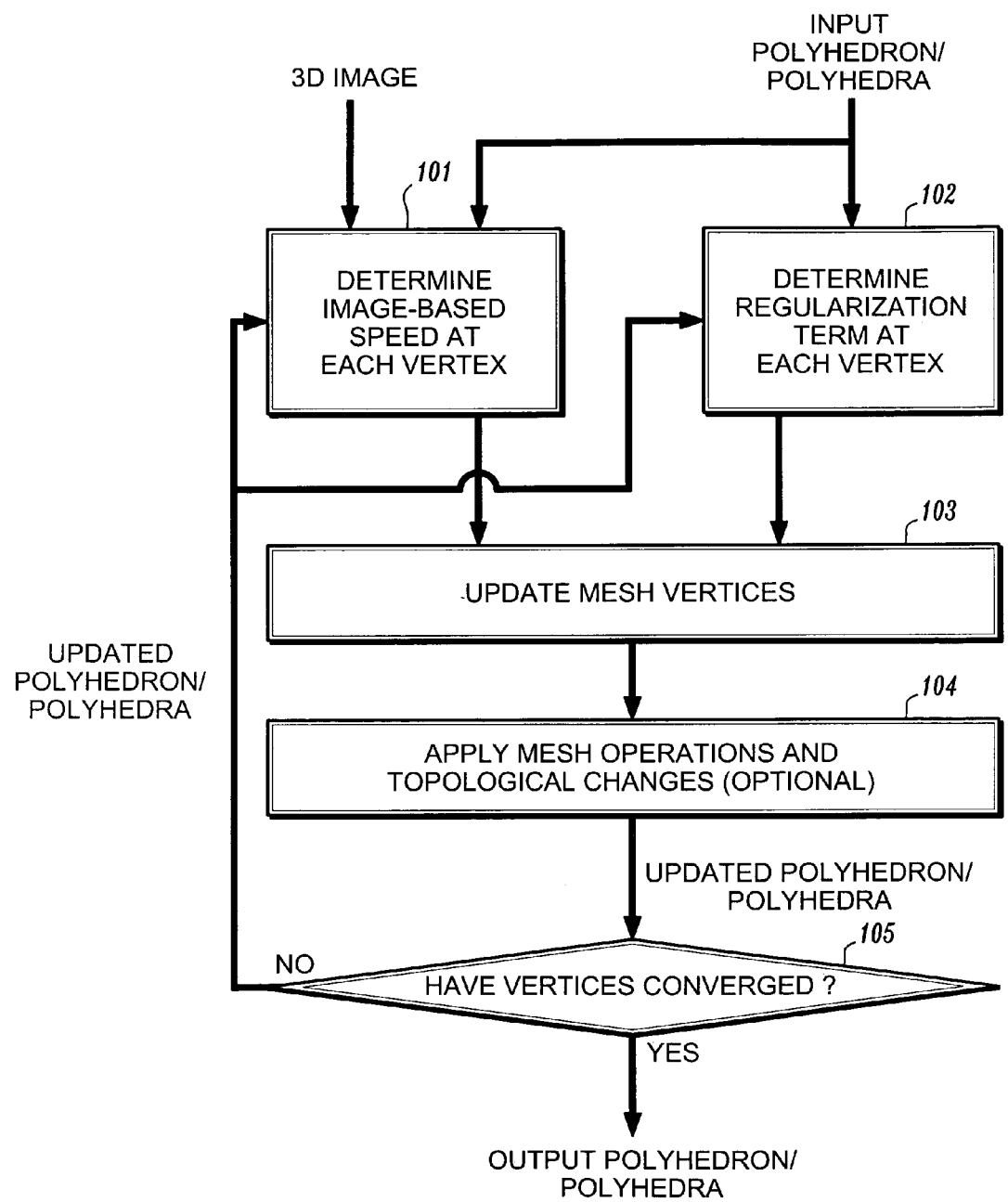
FIG. 1 is a flow chart according to an embodiment of the present disclosure.

A method for determining motion for an active polyhedron has been derived by minimizing an energy function using gradient descent. Referring to FIG. 1, a flow chart of a method according to an embodiment of the present disclosure, a 3D image including a volume of interest and a polyhedron are provided as input. The input polyhedron may be a shape such as a cube in the 3D image. Given a surface $S: \mathbb{R}^2 \to \mathbb{R}^3$ around a region $R \subset \mathbb{R}^3$, as well as a function $f: \mathbb{R}^3 \to \mathbb{R}$, and using a divergence theorem to express the energy of the surface determined over R as a surface integral over $\partial R$, $$E(S) = \int\int\int_R f(x, y, z) dx dy dz \qquad (1)$$
$$= \int\int_{S=\partial R} \langle F, N \rangle dS,$$

where N denotes the outward unit normal to S, and F is chosen so that $\nabla \cdot F = f$, dS is the differential area on the surface, and $\langle \cdot \rangle$ is the inner product operator. Using a surface parameterization of $S(u,v)=(x(u,v),y(u,v),z(u,v))$, this surface integral may be re-expressed as $$E(S) = \int\int_S \langle F, N \rangle \|S_u \times S_v\| du dv, \qquad (2)$$

where $S_u$ and $S_v$ are the derivatives of S with respect to u and v. Taking the derivative of E(S) with respect to a variable p whose variation affects the geometry of the surface, but is independent of the parameterization variables (u,v) can be shown to have the form $$E_p(S) = \int\int_S f \langle S_p, N \rangle \|S_u \times S_v\| du dv. \qquad (3)$$

Eq. (3) applies both to a continuous active surface as well as a surface discretely sampled using a polygonal mesh.

A constraint that S be a mesh of N triangles is added. $S_i$, the ith triangle of S, can be parameterized as $$S_i(u,v) = v_{1i} + u e_{1i} + v e_{2i}, \qquad (4)$$

where points $v_{1i}$, $v_{2i}$, and $v_{3i}$ are triangle vertices, triangle edge vectors $e_{1i} = v_{2i} - v_{1i}$, $e_{2i} = v_{3i} - v_{1i}$, and $u \in [0,1]$ and $v \in [0, 1-u]$ are the parameterization variables over which the integrals in the equations below will be evaluated. A depiction appears in FIG. 2A.

The vertices and edges used in the parameterization of a triangle are shown in FIG. 2A. Any point on the triangle can be expressed as $x_i = (v_{1i} + u e_{1i} + v e_{2i})$. In FIG. 2B, the $v_k$'s neighbor triangles $D_k$ are shown.

With this parameterization, $S_{iu} = e_{1i}$, $S_{iv} = e_{2i}$, $dS_i = \|e_{1i} \cdot e_{2i}\|$, Eq. (3) may be expressed as a sum of piecewise continuous integrals over the triangle faces, $$E_p(S) = \sum_{i=1}^{L} \int\int_{S_i} f(v_{1i} + u e_{1i} + v e_{2i}) \langle S_{ip}, N_i \rangle dS_i. \qquad (5)$$

$S_{ip}$ is defined for vertex $v_k$ as $$S_{ip}(u, v, v_k) = \begin{cases} (1-u-v)e, & S_i \in D_k \\ 0, & \text{otherwise} \end{cases} \qquad (6)$$

where $D_k$ is the set of M surface triangles that neighbor vertex $v_k$, as depicted in FIG. 2B, and $e = [e_x, e_y, e_z]$ denotes one off the standard basis vectors for $\mathbb{R}^3$. An evaluation of Eq. (5) with p equal to one of coordinates of $v_k$ yields:

$$E_p(S) = \sum_{i=1, S_i \in D_k}^{M} \int\int_{S_i} f(v_{1i} + u e_{1i} + v e_{2i}) \langle (1-u-v)e, N_i \rangle dS_i$$
$$= \sum_{i=1, S_i \in D_k}^{M} \langle e, N_i \rangle \int\int_{S_i} (1-u-v) f(v_{1i} + u e_{1i} + v e_{2i}) dS_i.$$

If a time variable t is introduced and coordinates $(x_i, y_i, z_i)$ are evolved in the gradient directions given above, the following gradient flow is obtained for the vertex $v_k$, $$\frac{d v_k}{d t} = A(v_k) \qquad (7)$$
$$= \sum_{i=1, S_i \in D_k}^{M} \int\int_{S_i} (1-u-v) f(v_{1i} + u e_{1i} + v e_{2i}) dS_i N_i.$$

Eq. (7) is an ordinary differential equation (ODE) that describes the vertex motion of the active polyhedron (see FIG. 1, 101). This equation can be computed using $MK^2$ operations, where K is the number of samples (in one dimension) on a triangle at which the integration occurs. Note that Eq. (7) is significantly different than continuous models as the function $f$ is integrated over triangular faces rather than applied pointwise. This integration of $f$ provides added robustness to noise, which is particularly useful when segmenting 3D noisy images. Also note that the image-based data term $f$ in Eq. (7) is general, allowing one to design different flows for solving various problems.

The flow of an active polyhedron may, under the sole influence of a data term, become irregular when a vertex becomes infinitesimally close to a non-neighbor face of the polyhedron. To address this issue, a natural regularization term a based on electrostatic principles is incorporated.

The electrostatic regularization technique models a uniform charge density $\lambda$ along each surface triangle. This charge density induces a global electric field $G \in R^3$ that applies a repulsive force at each vertex. To determine the electric field at a general point $p \in R^3$, the differential electric field $dG(p)$ exerted by a charged particle at location $x_i$ on triangle $S_i$ needs to be considered. As given by Coulomb's law, the electric force is inversely proportional to the square of the Euclidean distance $\|p-x_i\|^2$ between the charged particles, and directed along the vector $(p-x_i)/\|p-x_i\|$.

$$G(p) = \sum_{i=1}^{N} \int\int_{S_i} \lambda \frac{p-x_i}{\|p-x_i\|^n} dS_i \quad (8)$$

where $x_i=(v_{1i}+ue_{1i}+ve_{2i})$ is a point on $S_i$, and $n=4$.

While using $n=3$ in Eq. (8) imparts a repulsive force to a surface vertex, it fails to become singular as the vertex approaches the surface. This can be demonstrated if one considers a vertex $p=[0,0,z]^T$ directly above a disk of uniform charge and radius r as depicted in FIG. 3. In this case, electromagnetics gives the electric field:

$$G(p) = 2\pi\lambda\left(1 - \frac{z}{\sqrt{z^2+r^2}}\right)\hat{z}$$

and thus $$\lim_{z \to 0} G(p) = 2\pi\lambda\hat{z}.$$

Preferring an electric field that goes to infinity in the limit as the vertex moves towards the charged surface in order to prevent the surface from self-intersecting; n may be set to 4 in Eq. (8).

There are several ways to make use of Eq. (8) to displace vertex $v_k$ to regularize the surface. Perhaps the most thorough method would be to integrate the field G at each point $p \in D_k$, weighted by $(1-u-v)$ so that points closer to $v_k$ contribute more to the regularization, $$\frac{dv_k}{dt} = \sum_{j=1, S_j \in D_k}^{M} \int\int_{S_j} (1-u-v)G(x_j) dS_j, \quad (9)$$

where each $G(x_j)$ is computed over the L triangles $C_k = S \backslash D_k$ (to avoid infinities). However, for each vertex, such an approach includes solving sums of quadruple integrals, which has computational complexity of $LMK^4$ operations.

To reduce the computational load, the vertex displacement (see FIG. 1, 102) is determined as:

$$\frac{dv_k}{dt} = B(v_k) = \sum_{i=1, S_i \in C_k}^{L} \int\int_{S_i} \lambda \frac{p-x}{\|p-x_i\|^4} dS_i \quad (10)$$

which, for each vertex, has computational complexity of $LK^2$ operations. In practice, this approach offers sufficient regularization and is reasonably fast. This electric force is designed to be insignificant when $v_k$ is not very close to the surface triangles in $C_k$, but becomes influential, even dominant, when the vertex gets very close to triangles in $C_k$.

Referring now to an implementation of a method according to an embodiment of the present disclosure, a combination of Eq. (7) and Eq. (10) yields the vertex flow (see FIG. 1, 103):

$$\frac{dv_k}{dt} = \alpha A(v_k) + (1-\alpha)B(v_k); \quad (11)$$

where $\alpha$ is a constant that weights the data term relative to the regularization term. In practice, a value of $\alpha=0.95$ offers desirable performance. With this heavier weight on the data term, the regularization contributes significantly to the flow when degeneracy occurs, allowing for the data term to govern the evolution during most of the evolution. Since updating a single vertex includes $(L+M)K^2=NK^2$ operations, the complexity of a method according to an embodiment of the present disclosure is $N^2K^2$ operations for each time step.

The implementation of the active polyhedron supports mesh operations including edge splitting and collapsing, so that the mesh maintains a proper vertex density during evolution. These operations allow the surface to grow and to shrink. Topological changes can be modeled as well.

Referring to mesh operations (see FIG. 1, 104); While the surface is deforming, mesh operations achieve a mesh having a desirable vertex distribution. Towards this end edge split, edge collapse and face split operations are implemented.

Figure 6:
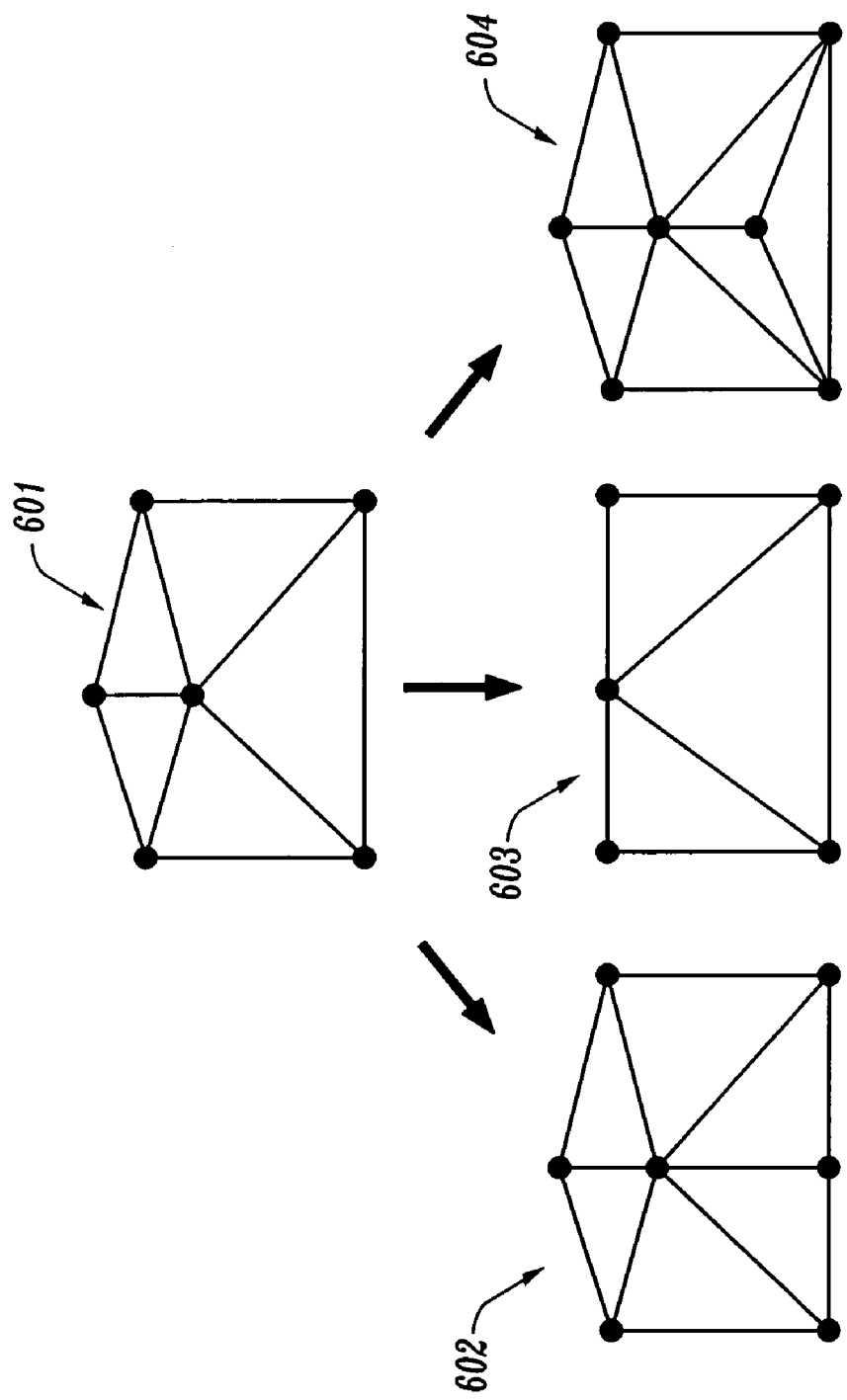
FIG. 6 illustrates mesh operations according to an embodiment of the present disclosure.

The edge split operation splits any edge whose length goes above a maximum length. A new vertex is placed at the center of the edge, and each triangle that included the edge is split into two, as shown in FIG. 6. The edge collapse operation collapses any edge whose length goes below a minimum length. The two vertices that comprise the edge are merged to one vertex, as shown in FIG. 6. For the face split operation, during evolution, the magnitude of the image force applied to each face is computed. If face splitting is enabled, the triangle with the largest magnitude force is split into three triangles by placing a new vertex at the triangle center, as shown in FIG. 6. The intuition here is that the edges with higher image speeds are close to image structures that may require finer details. Face splitting is enabled periodically during the surface flow.

These operations allow the surface to grow and to shrink without the need to support topological changes. For many applications this is an advantage rather than a disadvantage. Topological changes may introduce complexities into the topology of the level-set surface due to surface breaks or leaks into surrounding unrelated regions while propagating. It should be understood that topology adaptivity can be added to an active polyhedron according to an embodiment of the present disclosure. For example, topological transformations including merging, splitting, creation, and deletion may be implemented.

FIG. 6 shows mesh operations wherein the topmost mesh 601 is refined using the edge split operator 602, edge collapse operator 603 and face split operator 604.

A speed term is introduced. For region-based functional for segmentation, the image-based speed term $f$ described in Eq. (7) has a form that can be customized for specific tasks. For image segmentation, a piecewise constant region-based energy function that uses mean statistics is implemented as:

$$f(x) = -(I(x)-m_i)^2 + (I(x)-m_o)^2 \quad (12)$$

where I is the 3D image, x is a point on the surface, $m_i$ and $m_o$ are the mean values of I inside and outside the polyhedron, respectively. This speed function is well suited to the segmentation of noisy images, as it does not rely on the image gradients. The voxels inside and outside the surface are found via scanline rasterization of the polyhedron.

Referring to a speed term for a boundary-based functional for reconstruction from unorganized points; For reconstructing surfaces from unorganized points, a gradient flow on a distance volume is used to find the minimal distance surface. That is, $$f(x) = -\nabla D(x) \cdot N(x) \quad (13)$$

where D is a distance volume formed by placing the unorganized points into a volumetric grid and determining the unsigned distance at each voxel to the closest unorganized point, and N is the surface normal.

The deformation and mesh operations continue until convergence of the vertices (see FIG. 1, 105). A polyhedron is output upon determining that the vertices have converged. Convergence may be determined manually, where the polyhedron does not appear to change over time, or may be determined according to an energy function, for example, see Eq. (12). The energy function of the polyhedron decreases over time to a minimum as the polyhedron evolves. A threshold may be used to determine convergence, e.g., the change in the energy function describing the polyhedron is less than a predetermined threshold, or may be an energy function threshold below which convergence is defined.

Figure 4:
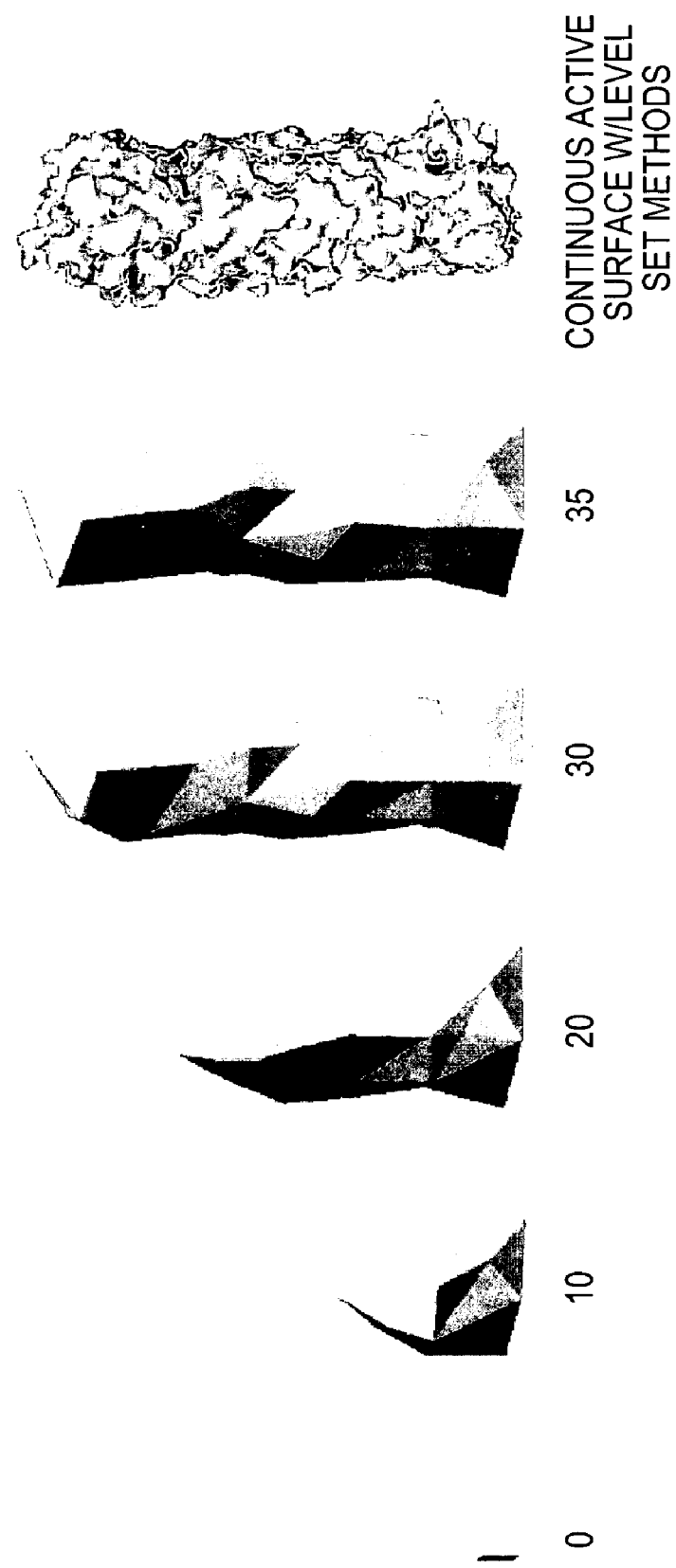
FIG. 4 is a 3D segmentation using an active polyhedron according to an embodiment of the present disclosure.

Experimental results show an active polyhedron's ability to segment 3D image data. A first example consists of a $128^3$ volume of synthetic ultrasound data. The data suffers poor contrast and corruption by speckle noise. Inside the volume is a darker cylindrical structure that simulates a blood vessel. This data is segmented by placing a cube inside and at one end of the vessel, and evolve the active polyhedron using a regional data term based on the mean inside vs. the mean outside the surface and the electrostatic regularizer. FIG. 4 shows the evolving active polyhedron for t=0, 10, 20, 30, and 35 iterations, upon which the surface converged (see FIG. 1, 105). On the right of FIG. 4 a segmentation result achieved with the same data term and a curvature-based regularizer using a continuous active surface implemented with level set methods is shown. Notice that result obtained with the active polyhedron is much smoother due to the integration of the data term along each triangle face, compared to the pointwise motion of the continuous active surface, which suffers multiple topology changes and leaking due to the speckle. Although it is possible to increase the regularization of the continuous active surface, doing so results in unsatisfactory results as the data term becomes ineffective in being attracted to target image features. The active polyhedron model produces better segmentation results, as is apparent in 2D slices of the volume, shown in FIGS. 5A-D.

Figure 5A:
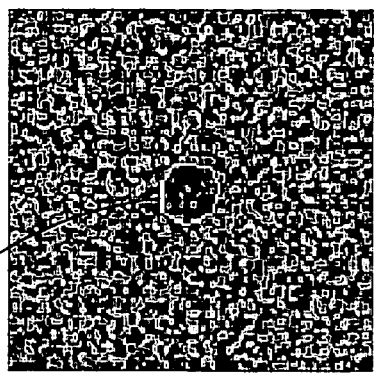
FIG. 5A-B are images of two dimensional slices according to an embodiment of the present disclosure.
Figure 5B:
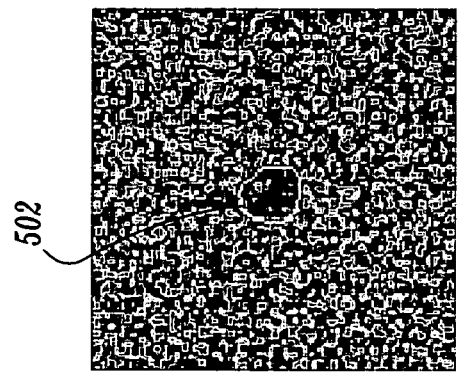
Figure 5C:
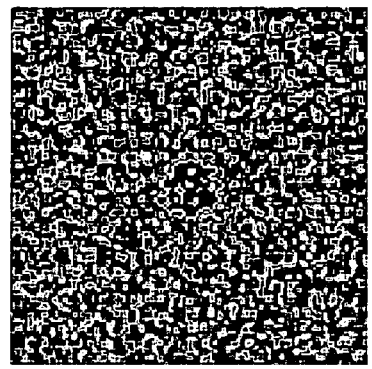
FIG. 5C-D are images of two dimensional slices from a segmentation result using a continuous active surface implemented with level set methods.
Figure 5D:
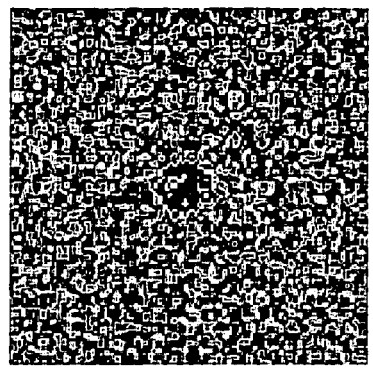

In FIGS. 5A and 5B slices 50 (501) and 90 (502) are shown, used with a polyhedral model according to an embodiment of the present disclosure. In FIGS. 5C and 5D the same slices are shown from the segmentation result using a continuous active surface implemented with level set methods.

It is to be understood that a method for 3D image segmentation using an active polyhedron according to an embodiment of the present disclosure may be implemented in various forms of hardware, software, firmware, special purpose processors, or a combination thereof. In one embodiment, a method for 3D image segmentation using an active polyhedron may be implemented in software as an application program tangibly embodied on a program storage device. The application program may be uploaded to, and executed by, a machine comprising any suitable architecture.

Figure 7:
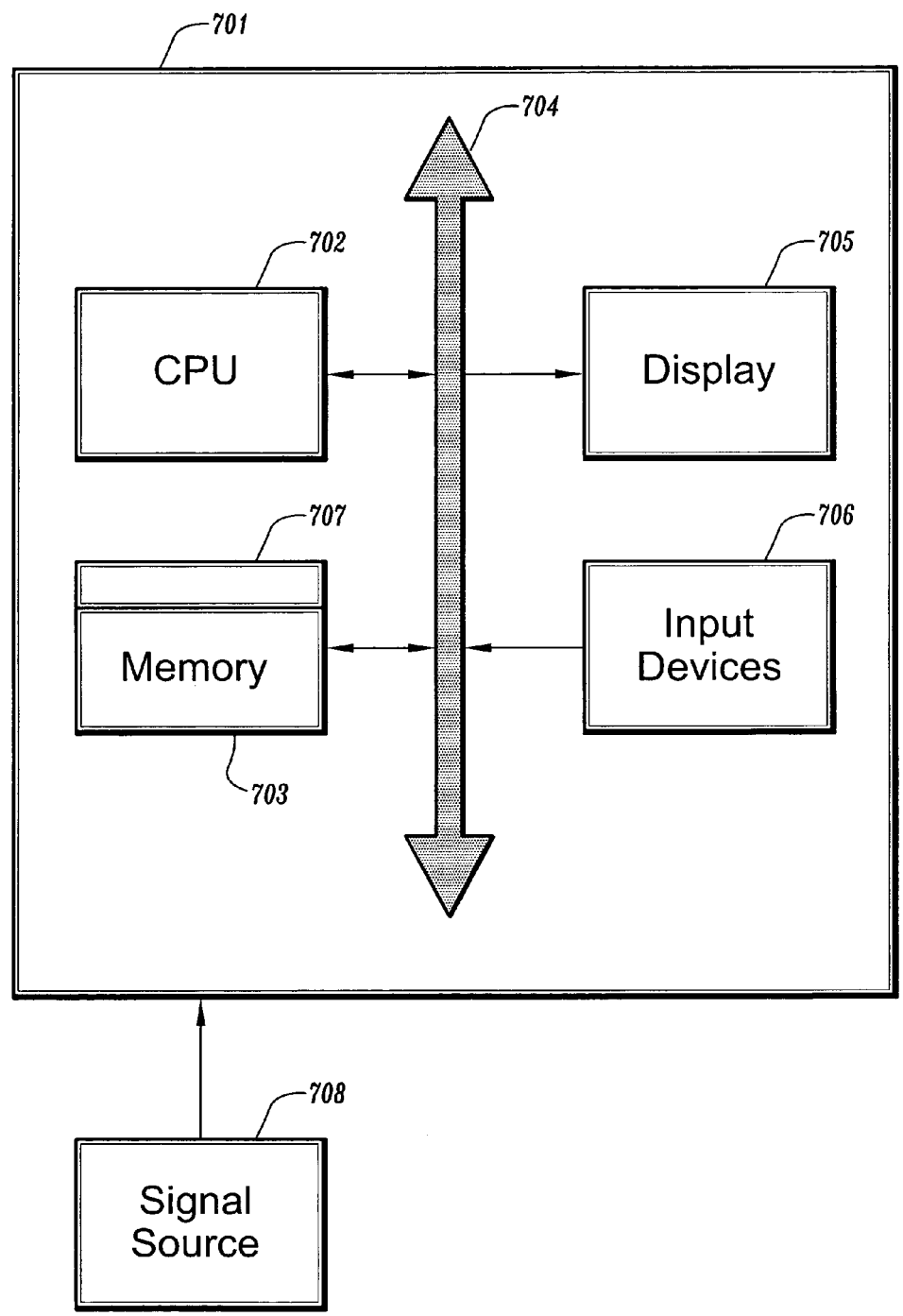
FIG. 7 is a diagram of a system according to an embodiment of the present disclosure.

Referring to FIG. 7, according to an embodiment of the present invention, a computer system 701 for implementing the present invention can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include random access memory (RAM), read only memory (ROM), disk drive, tape drive, etc., or a combination thereof. The present invention can be implemented as a routine 707 that is stored in memory 703 and executed by the CPU 702 to process the signal from the signal source 708. As such, the computer system 701 is a general purpose computer system that becomes a specific purpose computer system when executing the routine 707 of the present invention.

The computer platform 701 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for a 3D image segmentation using an active polyhedron, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for three dimensional image segmentation of a volume of interest comprising:

providing a three dimensional image of the volume of interest;

providing an initial polyhedron having a plurality of mesh vertices within the three dimension image;

determining an image-based speed directed along a surface normal at each vertex of the polyhedron using an ordinary differential equation (ODE) that describes the vertex motion of the polyhedron;

determining a regularization term at each vertex of the polyhedron;

updating the plurality of mesh vertices of the polyhedron, integrating the image-based speed of each vertex over a face of the polyhedron; and determining an output polyhedron approximating a shape of the volume of interest.

2. The method of claim 1, further comprising determining iteratively the image-based speed of each vertex and the regularization term, and updated mesh vertices until the vertices of the polyhedron have converged.

3. The method of claim 1, further comprising performing a mesh operation after updating the plurality of mesh vertices of the polyhedron to grow or shrink a surface of the polyhedron.

4. The method of claim 3, wherein the mesh operation is one of an edge split, an edge collapse and a face split.

5. The method of claim 1, wherein the regularization term prevents a surface of the polyhedron from self-intersecting.

6. The method of claim 5, wherein the regularization term increases in influence as a vertex approaches a surface of the polyhedron.

7. The method of claim 6, wherein the regularization term is based on electrostatic principles and does not penalize high curvature.

8. A program storage device readable by machine, tangibly embodying a program of instructions executable by the machine to perform method steps for three dimensional image segmentation of a volume of interest, the method steps comprising:

providing a three dimensional image of the volume of interest;

providing an initial polyhedron having a plurality of mesh vertices within the three dimension image;

determining an image-based speed directed along a surface normal at each vertex of the polyhedron using an ordinary differential equation (ODE) that describes the vertex motion of the polyhedron;

determining a regularization term at each vertex of the polyhedron;

updating the plurality of mesh vertices of the polyhedron, integrating the image-based speed of each vertex over a face of the polyhedron; and determining an output polyhedron approximating a shape of the volume of interest.

9. The method of claim 8, further comprising determining iteratively the image-based speed of each vertex and the regularization term, and updated mesh vertices until the vertices of the polyhedron have converged.

10. The method of claim 8, further comprising performing a mesh operation after updating the plurality of mesh vertices of the polyhedron to grow or shrink a surface of the polyhedron.

11. The method of claim 10, wherein the mesh operation is one of an edge split, an edge collapse and a face split.

12. The method of claim 8, wherein the regularization term prevents a surface of the polyhedron from self-intersecting.

13. The method of claim 12, wherein the regularization term increases in influence as a vertex approaches a surface of the polyhedron.

14. The method of claim 13, wherein the regularization term is based on electrostatic principles and does not penalize high curvature.

* * * * *